Jan. 26, 1932.     J. C. McCUNE     1,842,477
LOCOMOTIVE BRAKE
Filed Dec. 11, 1929
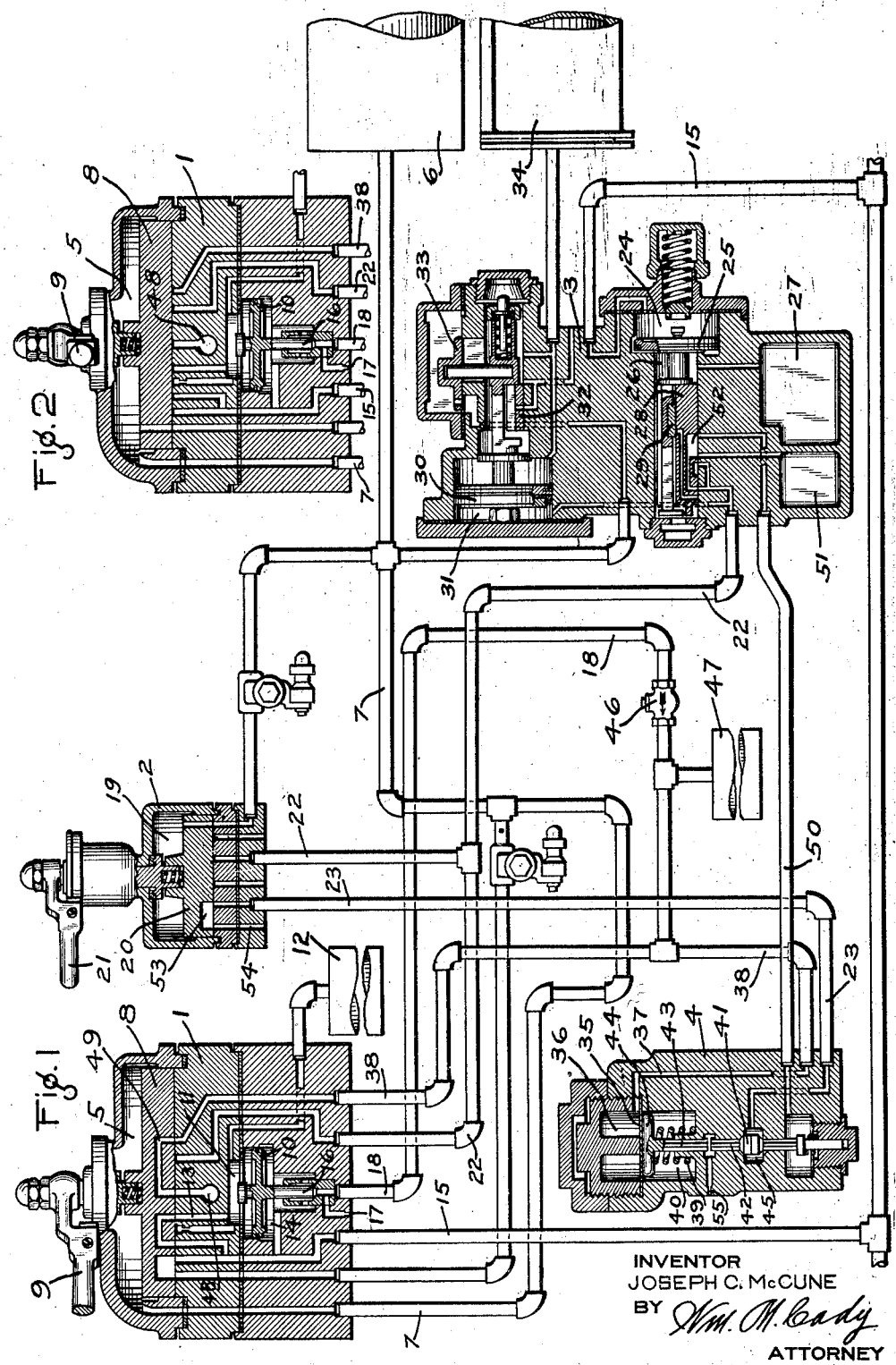
INVENTOR
JOSEPH C. McCUNE
BY *Wm. M. Cady*
ATTORNEY Patented Jan. 26, 1932

1,842,477

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

LOCOMOTIVE BRAKE

Application filed December 11, 1929. Serial No. 413,227.

This invention relates to fluid pressure brakes, and more particularly to a locomotive brake of the type known as the E-T locomotive brake equipment.

With the above type of locomotive brake equipment, an automatic brake valve device, an independent brake valve device, and a distributing valve device are employed. The distributing valve device comprises an equalizing valve device and an application and release portion. In the release position of the equalizing valve device, the application chamber of the application portion is connected to a distributing valve release pipe, and in running position of the independent brake valve, the release pipe is connected, through a pipe known as a U pipe, with the automatic brake valve. In running position of the automatic brake valve, the U pipe is connected to the atmosphere, so that when the equalizing valve device is moved to release position, the application chamber is connected to the atmosphere and the application and release portion is operated to release fluid under pressure from the brake cylinder.

When either the automatic or the independent brake valve is operated to effect an application of the brakes, communication from the distributing valve release pipe to the atmosphere is cut off.

For certain reasons, in some instances, it has been proposed to dispense with the U pipe, so that the distributing valve release pipe is open to the atmosphere at the independent brake valve, when the independent brake valve is in running position.

When this is the case, if surges in brake pipe pressure should occur, such as by the alternate opening and closing of the usual equalizing discharge valve, the equalizing valve device may be shifted to release position, while the brakes are still applied, and fluid will then be vented from the application chamber to effect the release of the brakes, by way of the distributing valve release pipe, when such release is not desired nor intended.

The principal object of my invention is to provide means for preventing the release of the brakes under the above circumstances.

In the accompanying drawings; Figure 1 is a diagrammatic view, partly in section, of a locomotive brake equipment embodying my invention; and Fig. 2 a sectional view of the automatic brake valve device, showing the rotary valve in service lap position.

The equipment shown in the drawings comprises an automatic brake valve device 1, an independent brake valve device 2, a distributing valve device 3, and a release controlling valve device 4.

The automatic brake valve device 1 comprises a casing having a valve chamber 5, connected to the usual main reservoir 6 by pipe 7 and containing a rotary slide valve 8, adapted to be operated by a handle 9. The casing also contains the usual equalizing discharge valve mechanism comprising a piston 10 having the chamber 11 at one side connected to the usual equalizing reservoir 12 and said chamber having a passage 13 leading to the seat of valve 8. The chamber 14 at the opposite side of piston 10 is connected to the usual brake pipe 15.

A discharge valve 16, operated by piston 10, controls the venting of fluid under pressure from the brake pipe to the atmosphere through a restricted discharge port 17 and to a pipe 18.

The independent brake valve device 2 comprises a casing having a valve chamber 19 containing a rotary slide valve 20 adapted to be operated by a handle 21. An application cylinder pipe 22 leads to the seat of valve 20 as well as to the seat of the rotary valve 8, and a pipe 23, connected to the release controlling valve device 4, also leads to the seat of the rotary valve 20.

The distributing valve device 3 comprises an equalizing valve device having a piston chamber 24, connected to the brake pipe 15 and containing piston 25 and having a valve chamber 26, connected to a pressure chamber 27, and containing a main slide valve 28, and a graduating slide valve 29 adapted to be operated by piston 25.

The application and release portion of the distributing valve device comprises a piston 30 contained in an application cylinder 31, a release slide valve 32, and an application slide valve 33 adapted to be operated by piston 30 for controlling the release and admission of fluid under pressure from and to the brake cylinder 34.

The release controlling valve device 4 comprises a casing in which is mounted a flexible diaphragm 35, having the chamber 36 at one side connected to passage 37 and pipe 38 and subject on the opposite side to the pressure of spring 39 contained in chamber 40.

A double beat valve 41 is provided with a stem 42 adapted to be engaged by a stem 43 carried by a follower plate 44, engaging the diaphragm 35. The valve chamber 45 containing the double beat valve 41 is connected to pipe 23. Pipe 18 is connected to pipe 38 and contains a check valve 46 and is connected to a volume reservoir 47.

When the rotary valve 8 of the automatic brake valve device 1 is in running position, as shown in Fig. 1 of the drawings, pipe 38 is connected to an atmospheric exhaust port 48, through cavity 49 in the rotary valve. Pipe 18 is open to vent port 17, so that when the discharge valve 16 is seated, the pipe 18 remains at atmospheric pressure. Chamber 36 of the release controlling valve device 4 is therefore at atmospheric pressure while the rotary valve 8 is in running position, and spring 39 acts to hold the stem 43 out of engagement with the stem 42, so that the double beat valve 41 is seated upwardly, and communication is established from pipe 23 to pipe 50, which pipe is the distributing valve release pipe.

With the equalizing valve device in release position, the application cylinder 31 and the application chamber 51 are connected through cavity 52 in slide valve 28 with pipe 50 and consequently the application cylinder is connected to the atmosphere by way of pipe 50, past the double beat valve 41, pipe 23, cavity 53 in the rotary valve 20 and exhaust port 54.

When the automatic brake valve handle 9 is turned to service position, fluid under pressure is vented from the equalizing piston chamber 11, and the piston 10 is operated to unseat the discharge valve 16, so that fluid under pressure is vented from the brake pipe 15 to the exhaust port 17 and to pipe 18. Fluid under pressure supplied to pipe 18 charges the volume reservoir 47 and flows through pipe 38 and passage 37 to chamber 36 of the release controlling valve device 4, so that the diaphragm 35 is thereby shifted downwardly and the double beat valve 41 is moved to its lower seat.

In this position, the double beat valve cuts off communication from the distributing valve release pipe 50 to pipe 23, while pipe 23 is connected to the atmosphere by way of restricted exhaust port 55.

The reduction in brake pipe pressure produced by the movement of the automatic brake valve to service position, causes the equalizing valve device of the distributing valve device 3 to move to service position, in which fluid under pressure is supplied to the application cylinder 31. The application piston 30 is then operated in the usual manner, so that the supply valve 33 is moved to effect the supply of fluid under pressure to the brake cylinder 34.

If surges in brake pipe pressure should occur and should the equalizing piston 25 be shifted to release position, fluid under pressure will not be vented from the application cylinder 31 through the distributing valve release pipe 50, since communication from said pipe to the atmosphere is cut off by the double beat valve 41.

In the running position of the automatic brake valve, pipe 38 is connected to exhaust port 48, through cavity 49 in the rotary valve 8, so that the chamber 36 is open to the atmosphere in this position.

In service lap position, as shown in Fig. 2, the pipe 38 is cut off from the exhaust port 48, to permit the chamber 36 to be charged by flow from pipe 18. The check valve 46 in pipe 18, prevents back flow from chamber 36 and reservoir 47, so that fluid will not be vented through exhaust port 17, when the discharge valve 16 seats and cuts off the supply of fluid under pressure to the pipe 18.

In release, running, and holding positions of the automatic brake valve, the pipe 38 is connected to the atmosphere, so that when the brake valve is in one of these positions, the release controlling valve device is operated to connect the distributing valve release pipe 50 to the atmosphere.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a locomotive fluid pressure brake equipment, the combination with a brake pipe, a distributing valve device operated by variations in brake pipe pressure for controlling the application and release of the brakes, an independent brake valve device, and a distributing valve release pipe, through which fluid under pressure is released from the distributing valve device to effect the release of the brakes through an atmospheric port directly controlled by said independent brake valve device, of a release controlling valve device operated upon a reduction in brake pipe pressure for cutting off the release of fluid through the distributing valve release pipe.

2. In a locomotive fluid pressure brake equipment, the combination with a brake pipe, a distributing valve device operated by variations in brake pipe pressure for controlling the application and release of the brakes, and a distributing valve release pipe, through which fluid under pressure is released from the distributing valve device to effect the release of the brakes, of means for venting fluid under pressure from the brake pipe and a release controlling valve device operated by fluid vented from the brake pipe for cutting off the release of fluid through the distributing valve release pipe.

3. In a locomotive fluid pressure brake equipment, the combination with a brake pipe, a distributing valve device operated by variations in brake pipe pressure for controlling the application and release of the brakes, and a distributing valve release pipe, through which fluid under pressure is released from the distributing valve device to effect the release of the brakes, of a release controlling valve device operated by an increase in fluid pressure for cutting off the release of fluid through said release pipe, and means for supplying fluid under pressure, vented from the brake pipe in effecting a reduction in brake pipe pressure, to said release valve device.

4. In a locomotive fluid pressure brake equipment, the combination with a brake pipe, a distributing valve device operated by variations in brake pipe pressure for controlling the application and release of the brakes, and a distributing valve release pipe, through which fluid under pressure is released from the distributing valve device to effect the release of the brakes, of an automatic brake valve device, an independent brake valve device for controlling the release of fluid from said distributing valve release pipe independently of said automatic brake valve device, and a release controlling valve device for controlling communication through said release pipe from said distributing valve device to the independent brake valve device.

5. In a locomotive fluid pressure brake equipment, the combination with a brake pipe, a distributing valve device operated by variations in brake pipe pressure for controlling the application and release of the brakes, and a distributing valve release pipe, through which fluid under pressure is released from the distributing valve device to effect the release of the brakes, of an automatic brake valve device, an independent brake valve device for controlling the release of fluid from said distributing valve release pipe independently of said automatic brake valve device, and a release controlling valve device operated upon a reduction in brake pipe pressure for cutting off the release of fluid from said distributing valve release pipe through the independent brake valve device.

6. In a locomotive fluid pressure brake equipment, the combination with a brake pipe, a distributing valve device operated by variations in brake pipe pressure for controlling the application and release of the brakes, and a distributing valve release pipe, through which fluid under pressure is released from the distributing valve device to effect the release of the brakes, of an automatic brake valve device, an independent brake valve device for controlling the release of fluid from said distributing valve release pipe independently of said automatic brake valve device, means for effecting a reduction in brake pipe pressure, and a release controlling valve device operated by fluid under pressure vented from the brake pipe for cutting off communication from the distributing valve release pipe to the independent brake valve device.

In testimony whereof I have hereunto set my hand, this 9th day of December, 1929.

JOSEPH C. McCUNE.